US011392647B2

(12) United States Patent  
Asthana et al.

(10) Patent No.: US 11,392,647 B2  
(45) Date of Patent: Jul. 19, 2022

(54) INTENT-BASED QUESTION SUGGESTION ENGINE TO ADVANCE A TRANSACTION CONDUCTED VIA A CHATBOT

(71) Applicant: International Business Machines Corporation, Armonk, NY (US)

(72) Inventors: Ruchi Asthana, New York, NY (US); Jennifer A. Mallette, Vienna, VA (US); Shuai Wang, Sunnyvale, CA (US); Steven Ware Jones, Astoria, NY (US); Jacob Lewis, New York City, NY (US); Jia Liu, Astria, NY (US); Vivek Salve, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 16/586,801

(22) Filed: Sep. 27, 2019

(65) Prior Publication Data

US 2021/0097110 A1    Apr. 1, 2021

(51) Int. Cl.
*G06F 16/9032* (2019.01)
*G06K 9/62* (2022.01)
*H04L 51/02* (2022.01)
*G06F 40/35* (2020.01)

(52) U.S. Cl.
CPC ........ *G06F 16/90332* (2019.01); *G06F 40/35* (2020.01); *G06K 9/6257* (2013.01); *H04L 51/02* (2013.01)

(58) Field of Classification Search
None
See application file for complete search history.

(56) References Cited

U.S. PATENT DOCUMENTS

| 9,092,801 | B2 | 7/2015 | Chang |
| 11,093,855 | B1 * | 8/2021 | Fiedler ................... G06N 20/00 |
| 2013/0080362 | A1 | 3/2013 | Chang |
| 2014/0044243 | A1 | 2/2014 | Monegan |
| 2014/0317120 | A1 | 10/2014 | Ghose |
| 2016/0078456 | A1 | 3/2016 | Chakraborty |

(Continued)

OTHER PUBLICATIONS

Yang, et al., "Neural Matching Models for Question Retrieval and Next Question Prediction in Conversation," Jul. 17, 2017, arXiv:1707. 05409v1 [cs.IR], https://arxiv.org/pdf/1707.05409.pdf.

*Primary Examiner* — Antim G Shah
(74) *Attorney, Agent, or Firm* — Anthony V. S. England; Jordan Schiller; Susan M. Maze

(57) ABSTRACT

When a chatbot application is in a mode of live chat conversation with a user, a trained intent classifier determines an intent that underlies a first live question received by the trained intent classifier from the user. A trained next predictor receives the intent from the intent classifier. The trained next intent predictor generates a set of predicted next intents responsive to receiving the intent. A trained re-ranker selects at least one of the predicted next intents responsive to receiving the set of predicted next intents. A question selection engine sends at least one suggested question to the user responsive to receiving the at least one predicted next intent. As a result of the above, the chatbot application provides to the user at least one suggested next question the user may wish to ask in response to the first question from the user.

20 Claims, 5 Drawing Sheets

(56) References Cited

U.S. PATENT DOCUMENTS

| | | |
|---|---|---|
| 2017/0094058 A1 | 3/2017 | Piaggio |
| 2017/0351962 A1 | 12/2017 | Appel |
| 2020/0005117 A1* | 1/2020 | Yuan .................... G06N 5/022 |
| 2020/0007474 A1* | 1/2020 | Zhang ................ G09B 19/0053 |
| 2020/0227026 A1* | 7/2020 | Rajagopal ............. G10L 15/063 |

* cited by examiner

INTENT-BASED QUESTION SUGGESTION ENGINE TO ADVANCE A TRANSACTION CONDUCTED VIA A CHATBOT

BACKGROUND

On live chat, users chat with live representatives (also referred to as live "agents") about technical problems, product or service features, product or service selection, etc. Live representatives tend to move such conversations towards a successful resolution of the transaction, where success can be defined in many ways, including a technical problem resolution, a product purchase, a trial sign-up, etc.

SUMMARY

In an embodiment of the present invention, a computer-system implemented method for operating a chatbot application, includes receiving from a trained intent classifier, by a trained next intent predictor of the chatbot application when the chatbot application is in a mode of live chat conversation with a user, at least one intent that the intent classifier has determined underlies a first live question received by the trained intent classifier from the user. A next set of predicted next intents by the trained next intent predictor is generated in response to receiving the intent. At least one of the predicted next intents is selected by a trained re-ranker in response to receiving the set of predicted next intents. A question selection engine sends, in response to receiving the at least one predicted next intent, at least one suggested question to the user. As a result of the above, the chatbot application provides to the user, in response to the first question from the user, at least one suggested next question the user may wish to ask.

In another aspect, the method includes training, in a training mode of the chatbot application, the re-ranker to score intents relative to progress for a type of transaction for which the chatbot application is deployed.

In another aspect, selecting the at least one of the predicted next intents by the trained re-ranker includes generating, by the trained re-ranker in response to receiving the set of predicted next intents, a score for each predicted next intent of the set, wherein the score for each respective next predicted intent of the set indicates respective progress within a transaction that is a subject of the chat session, and wherein the re-ranker selects the at least one of the predicted next intents in response to the scores of the predicted next intents.

In another aspect, the intent classifier is configured to generate, in response to receiving user questions, intentions from among a predefined set of possible intentions, and training the re-ranker includes defining stages of the transaction and assigning predefined scores to the respective stages to indicate transaction progress associated with each respective stage and assigning each intent of the set of possible intentions to one of the respective stages of the transaction, wherein the scores assigned to each stage apply to the intents of the stage.

In another aspect, the method includes training, in a training mode of the next intent predictor, a model for predicting a user's next intent that will follow a current question from the user in a live chat conversation, wherein the training for the model is based solely on sequences of intents determined from historic chat conversation transcripts.

In another aspect, training the next intent predictor includes providing, to a next intent prediction trainer, sequences of intents that the intent classifier has determined underlie sequences of questions from the historic chat conversation transcripts, wherein the next intent prediction trainer trains the model for the next intent predictor based solely on intent-next intent pairs from the sequences of questions.

In another aspect, the method includes receiving from the trained intent classifier, by the chatbot application when the chatbot application is in the mode of live chat conversation with the user, at least one intent that the intent classifier has determined underlies a second live question received by the trained intent classifier from the user, wherein the second live question is one of the questions suggested to the user by the chatbot application in response to the first live question.

In other embodiments of the invention, other forms are provided, including a system and a computer program product.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
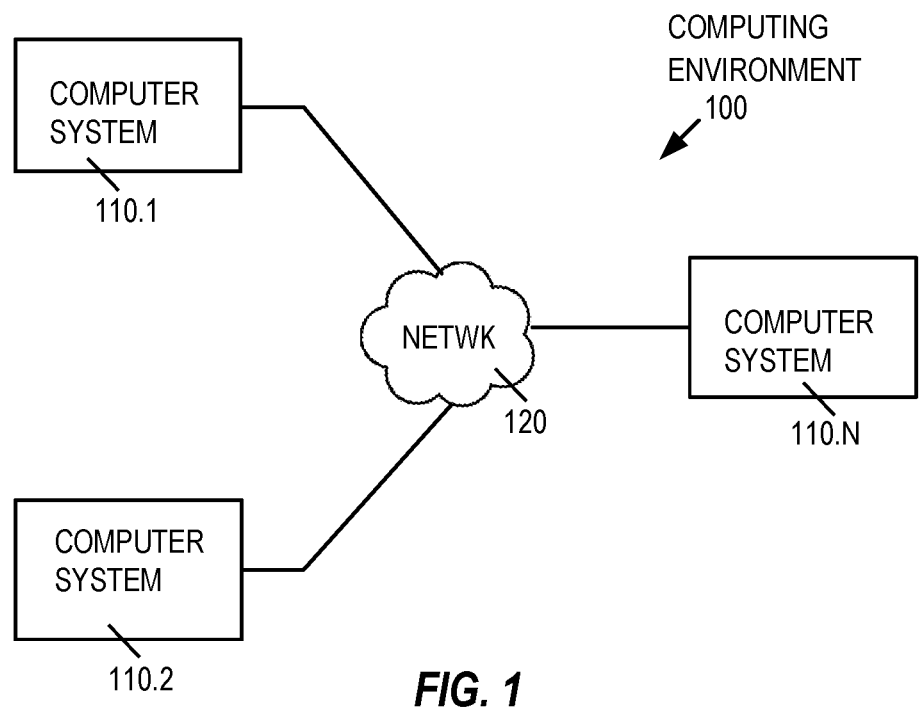
FIG. 1 illustrates a networked computer environment, according to embodiments of the present invention.

FIG. 1 illustrates an example computing environment 100, according to embodiments of the present invention. As shown, computing environment 100 includes computer systems 110.1, 110.2 through 110.N connects via network 120, which may be public or private. Systems 110.1, 110.2, etc. include modules, which may be program or hardware modules, configured to perform tasks for their own respective systems or for other systems or both.

Figure 2:
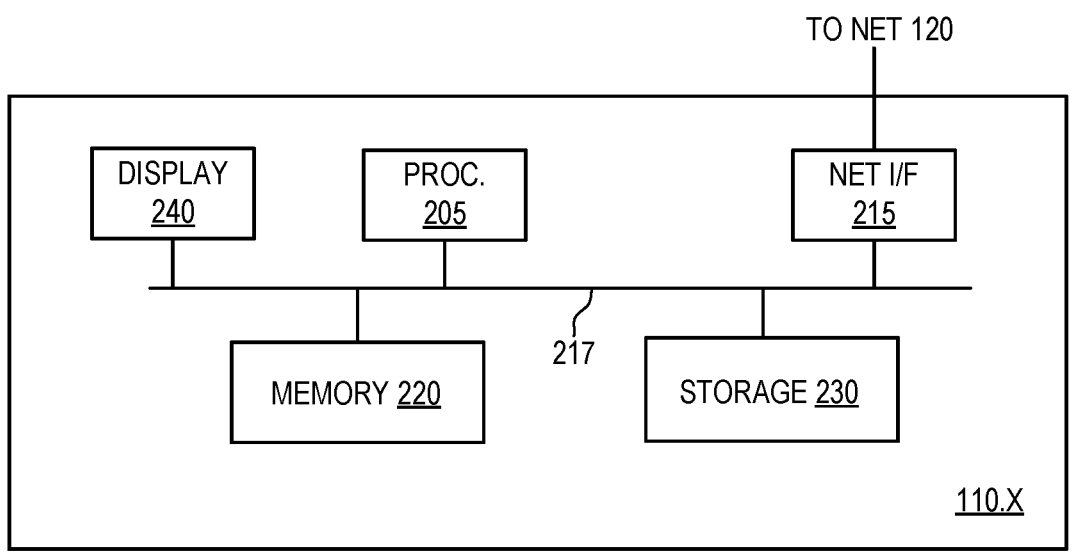
FIG. 2 is a block diagram of devices shown in FIG. 1, according to embodiments of the present invention.

FIG. 2 illustrates details of a computer system 110.X suitable as computer systems 110.1, 110.2, etc. according to embodiments of the present invention, wherein system 110.X includes at least one central processing unit (CPU) 205, network interface 215, interconnect (i.e., bus) 217, memory 220, storage device 230 and display 240 where system 110.X may include an icon management module 260. CPU 205 may retrieve and execute programming instructions stored in memory 220 for applications, including module 260. Similarly, CPU 205 may retrieve and store application data residing in memory 220. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random access memory, which includes data and program modules for run-time execution, such as model builder 103, according to embodiments of the present invention. It should be understood that system 110.X may be implemented by other hardware and that one or more modules thereof may be firmware.

According to embodiments of the present invention, a chatbot application is provided for transactions with users, where the application responds to questions from the users, which are typically general questions at first. The chatbot responses lead to more specific user questions and chatbot answers that ultimately progress to user fulfillment. Past chatbot applications have tended to be both complicated and limited at the same time, with the feel of a choose-your-own-adventure narrative with an artificial conclusion, instead of the feel of a dynamic conversation leading to a user-driven conclusion. Embodiments of the present invention involve a recognition that a satisfying user-chatbot dialog that progresses naturally and efficiently to a fulfilling user transaction may be facilitated by a chatbot application 300 configured as shown in FIG. 3.

Figure 3:
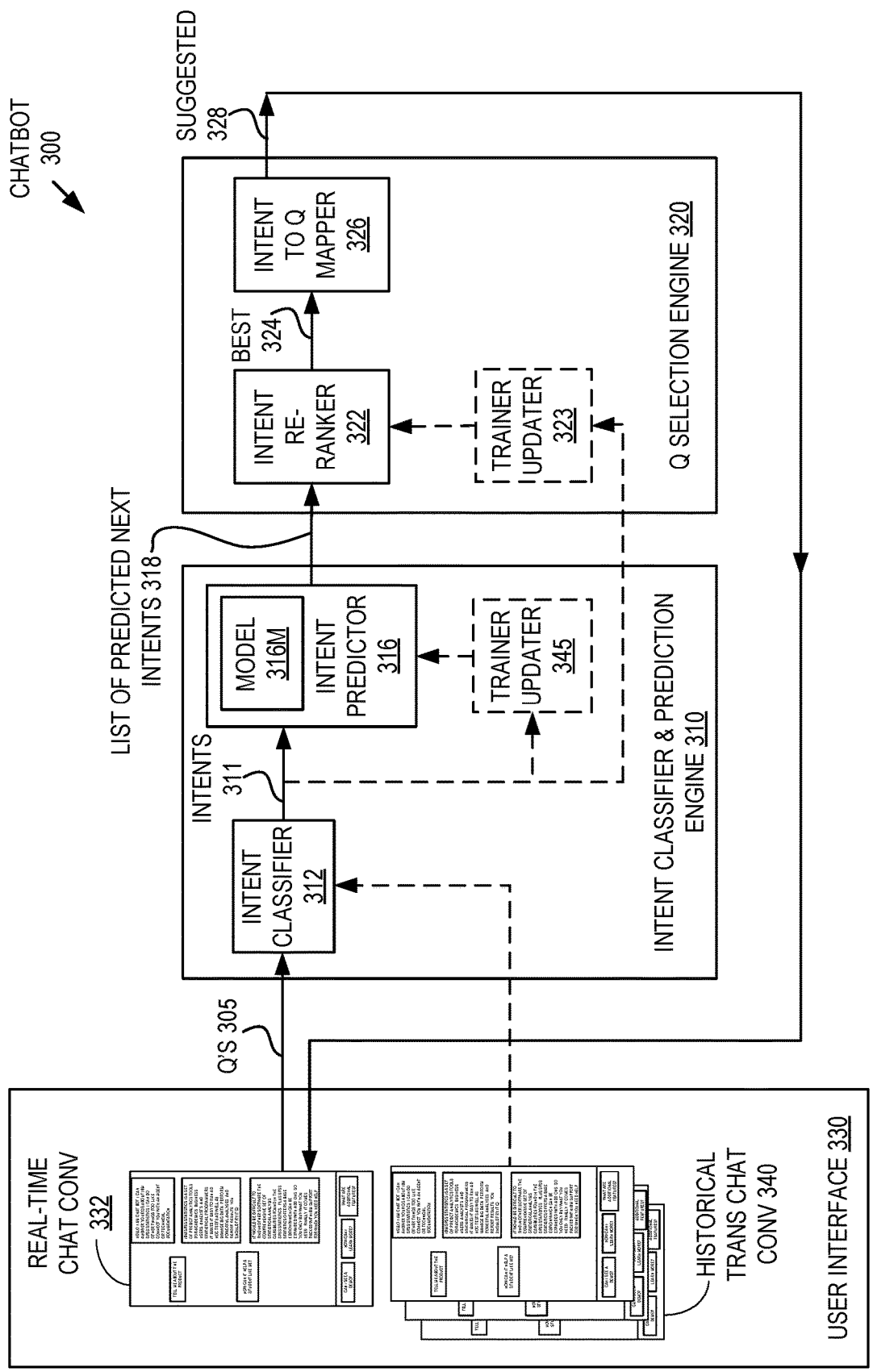
FIG. 3 illustrates a chatbot application, according to embodiments of the present invention.

As shown for an embodiment of the present invention in FIG. 3, chatbot application 300 receives user 335 questions 305 in real time conversation 332 via user interface 330 and inputs questions 305 to an intent classifier and predictor engine 310 of application 300. (Reference is made herein to application 300 receiving user 335 "questions" 305 as input. However, it should be understood that the term "questions" used herein—regarding questions 305 received and processed by application 300—include, more generally, user 335 utterances, such as requests, statements and questions from user 305.) Based on a pattern of user 335 questions 305 received by chatbot engine 310 via interface 330, engine 310 predicts a next intention 318 of user 335 in real time.

Chatbot application 300 has an question selection engine 320 that receives predicted next intentions 318 from engine 310 and responsively generates questions 328 that engine 320 presents as suggested questions to user 335 in real time conversation 332 via interface 330, i.e., questions that user 335 may likely want to ask chatbot application 300 in order to further dialog in conversation 332. (Although referred to herein as "user" questions 305, it should be appreciated that questions 305 from user 335 may include questions generated and presented to user 335 by engine 320 and then selected by user 335.)

In an embodiment of the present invention shown in FIG. 3, intent classifier and predictor engine 310 includes an intent classifier 312 and an intent predictor 316. Embodiments of the present invention involve a recognition of the importance of user intentions in user-chatbot conversations 332 and a further recognition that machine-based, classification of intentions (commercially available via a Watson Assistant service from International Business Machines Corporation) may be applied for use in engine 310 both for i) real-time generation by engine 310 of predicted next intentions 318 when application 300 is in live conversation mode and ii) supervised training of engine 310 when application 300 is in development/update mode, which is done off-line.

During use of application 300 in live conversation mode, intent classifier 312 receives user questions 305 from real-time chatbot conversations 332 and responsively classifies them as corresponding real-time user 335 intentions 314, which classifier 312 outputs to trained intent predictor 316, which responsively generates, and outputs predicted next intentions 318.

With application 300 in development/update mode, as shown by dashed lines in FIG. 3, intent classifier 312 is used off-line for building or training a model 316M for intent predictor 316 via trainer/updater 345. A set of intentions is predefined for classifier 312, according to embodiments of the present invention. In one embodiment, for example, the set of intentions 314 for classifier 312 are defined as Product Benefits, Use Case, Base Features, Features Analytics, Features Infrastructure, Product Differentiation, Features Customize, Features Import/Export, License Code, System Requirements, Large Scale Installations, Version Demo, Version Compare, Version Free Trial, Troubleshooting Tech Support, Buy, Purchase Options, Pricing, and Renewal.

In development/update mode, intent classifier 312 receives user questions 305 from historic transcripts 340 of previous user live chats and responsively classifies them as corresponding historic user 335 intentions 314, which classifier 312 outputs to trainer/updater 345. For at least one type of model included in intent predictor 316, according to an embodiment, trainer/updater 345 configures a sequence of received intentions 314 as training data sample pairs, which trainer/updater 345 then uses to build and train an intent predictor model that it outputs to intent predictor 316 to use during run-time for generating predictions 318 in response to real-time 305 questions.

Figure 4:
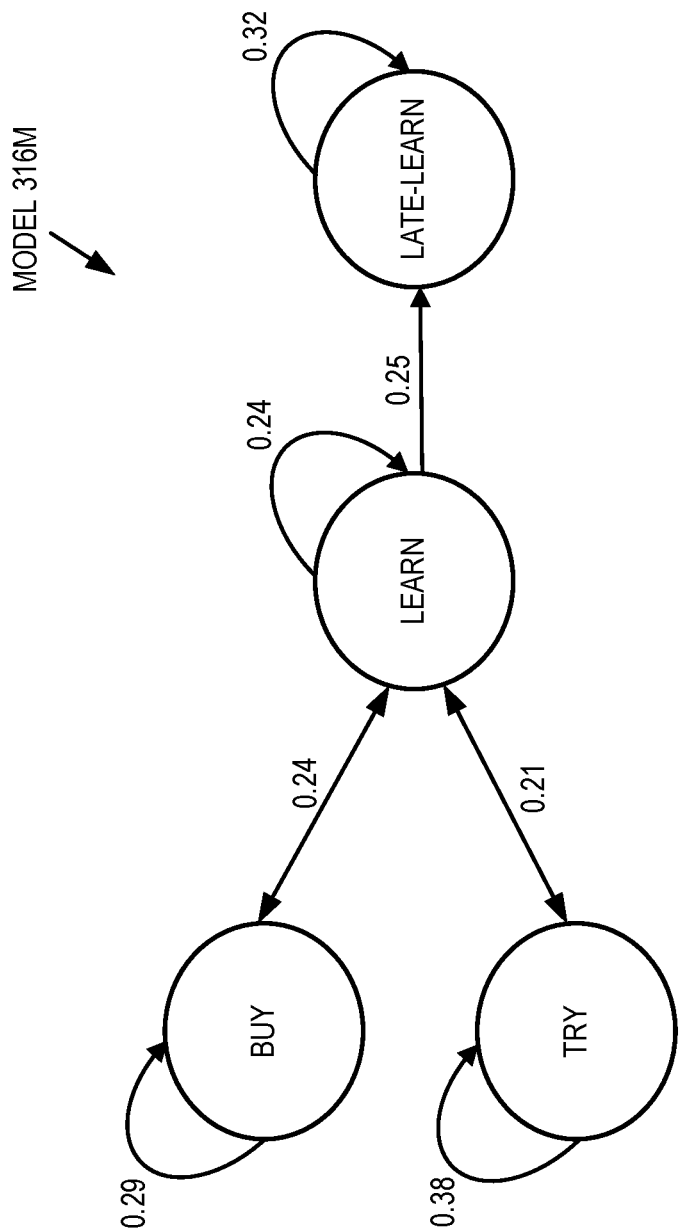
FIG. 4 illustrates a Markov type model, according to embodiments of the present invention.

More specifically, for at least a Markov type model 316M such as shown in FIG. 4, for example, trainer/updater 345 builds a matrix of intent 314 pair frequencies by counting occurrences of each kind of intention 314 pair types. In this context, an "intention 314 pair" refers to a first intent occurring in an intent 314 sequence before a second intent 314, which may or may not be the same as the first intent 314. The second intent 314 is output by classifier 312 in direct response to a second question 305 immediately after outputting the first intent 314 in direct response to a first question 305, where first question 305 occurred in historical conversation 340 transcript immediately before the second question 305. Thus, for an example where intentions 314 are predefined as type 1, type 2 . . . type N, "counting occurrences of each kind of intention 314 pair types" refers to counting how many times intention type 1 immediately precedes intention type 1 (which provides a (type 1, type 1) type of intention pair), how many times intention type 1 immediately precedes intention type 2 (which provides a (type 1, type 2) type of intention pair), and so on through how many times intention type 1 immediately precedes intention type N (which provides a (type 1, type N) type of intention pair); also counting how many times intention type 2 immediately precedes intention type 1 (which provides a (type 2, type 1) type of intention pair), and so on through how many times intention type 2 immediately precedes intention type N (which provides a (type 2, type N) type of intention pair); and so on for all N types. Trainer/updater 345 then normalizes these frequency counts to convert them into probabilities, where each probability indicates the likelihood that one certain type of intention pair occurs after another certain type. Variables indicating respective intention pair types may then be set out with their respective probabilities in a transition matrix, which is a way of defining a Markov model.

In other embodiments, other types of models are used for model 316M, such as recurrent neural networks, which may include a long short-term memory model. In general, methods of developing and applying models of various types are well-known. Consequently, further details of developing model 316M are not presented herein. However, what is disclosed herein goes far beyond merely developing and applying a well-known type of model. That is, according to an embodiment of the present invention, a selected model 316M is developed and trained based on user intentions 314 underlying user questions 305 in chatbot conversation 340 transcripts, where model 316M predicts next intentions 318 that will underlie next user questions 305, where the predicted next intentions 318 provide a basis for question selection engine 320 to suggest next questions 328 to user 335, such as described in the following. Based on model 316 M and received current intention 314, intent predictor 316 outputs a list of next predicted intentions 318 with respective probabilities for each predicted next intention 318 to a re-ranker 322 of question selection engine 320. In an embodiment of the present invention, engine 320 includes an intent-to-question mapper 326 configured to generate suggested questions 328 that application 300 predicts user 335 may wish to ask next and, significantly, that application 300 also determines may be productive, as further explained herein. Mapper 326 generates suggested next questions 328 in response to receiving a set of best predicted next intentions 324 from re-ranker 322, which mapper 326 does, in an embodiment, by selecting and presenting questions from a pre-built database 327 that maps predicted next intentions 324 to corresponding next questions 328 that have been manually prepared and stored in database 327 prior to operating application in live conversation mode.

In order to limit output of intent-to-question mapper 326 to next question 328 suggestions that are most productive, re-ranker 322 selects a subset of predicted next intents 318 that re-ranker 322 receives from next intent predictor 316 and outputs the subset 324 to mapper 326. More specifically, re-ranker 322 outputs only the selected intents 324 based on ranking its received predicted next intents 318 according to a productive value ranking algorithm. The productive value ranking algorithm may provide a measure of business value for each predefined type of predicted next intent 318 that re-ranker 322 may receive, according to an embodiment of the present invention. By outputting only the highest valued subset 324 of predicted next intents 318 to mapper 326, re-ranker 322 ensures that mapper 326, in turn, only generates suggested next questions 328 that have the highest value.

In an embodiment of the present invention, the productive value ranking algorithm of re-ranker 322 provides a measure of business value for each predefined type of predicted next intent 318 that re-ranker 322 may receive, as described herein, and re-ranker 322 outputs 324 only the three highest ranked ones of next predicted intents 318 for each transaction in conversation 332. With regard to the aforementioned "transaction" in conversation 332, each question 305 from user 335 received by intent classifier 312 may be deemed a transaction in this context. For each question 305 intent classifier 312 generates a corresponding intent 314, according to an embodiment of the present invention. In turn, trained intent predictor 316 generates and outputs a list of predicted next intents 318 and likelihoods for each respective one. (Output 318 may be referred to herein as an intent probability vector, since it includes predicted next intents and a probability—also known as a "likelihood"—for each such predicted intent.) This causes intent re-ranker 322 to select and output a highest valued subset 324 of the predicted next intents 318, such as the top three for example. In turn, intent-to-question mapper 326 outputs three suggested next questions 328 to user 335. When user 335 selects one of the suggested next questions 328 or enters a different question, remark or request, this begins a next transaction and the above transaction cycle repeats.

The ranking algorithm of intent re-ranker 322 assigns each intent of vector 318 a score that indicates how valuable it is to an enterprise for which chatbot application 300 is deployed, where the algorithm includes a transformation function and a scoring function. The transformation function transforms the received next intent probability vector 318 using the scoring function, whereupon re-ranker 322 outputs top ranked intents 328 of vector 318. In one embodiment of re-ranker 322, which may be referred to as a "buyer stage journey" embodiment, these scores are predetermined manually and correlate with a buyer stage in a buyer stage journey, where respective buyer stages are predefined and mapped manually to one or more of the intents 314 that classifier 312 is predefined to recognize. The following is an example, according to an embodiment of the present invention:

Buyer stage: Discover/Score: 1
    Example of predefined intents for the Discover stage:
Product Benefits
    Example utterances for this intent:
        What are the benefits of this product?
        Why is this product great?
        Why do I need this product?
Use Case
    Example utterances for this intent:
        What are the use cases?
        How can I use this product?
Buyer stage: Learn/Score: 2
    Example of predefined intents for the Learn stage:
Base Features
    Example utterances for this intent:
        Tell me about the basic functions
        What are the key features?
Features Analytics
    Example utterances for this intent:
        Can I use this to analyze charts?
        Can this help me with analytics?
Features Infrastructure
    Example utterances for this intent:
        Does it run on the cloud?
        Is this a cloud service?
        How does it work from an infrastructure side?
Product Differentiation
    Example utterances for this intent:
        What is the difference between this and its competitors?
        Why should I buy this product instead?
        What can this product do that others cannot?
Buyer stage: Late Learn/Score: 3
    Example of predefined intents for the Late Learn stage:
Features Customize
    Example utterances for this intent:
        How can I customize the features of this product for my needs?
        What customizations can I add to the product?
        Are there any customizations to make this product run faster on my Windows machine?
Features Import/Features Export
    Example utterances for this intent:
        What is the file type for import?
        What file types can you export?
        Are file exports compatible with Excel?

License Code
  Example utterances for this intent:
    Do I have a license code?
    What is the license code?
System Requirements
  Example utterances for this intent:
    What are the system requirements?
    What requirements do I need for a Windows Machine?
    What requirements do I need for a Mac?
Buyer stage: Try/Score: 4
  Example of predefined intents in the Try stage:
Version Demo
  Example utterances for this intent:
    Can I see a Demo?
    Where can I find a demo?
    How can I get access to a demo?
    Is there a demo with a financial use case?
Version Compare
  Example utterances for this intent:
    Can you tell me the difference between the gold version and the platinum version?
    Can you tell me the difference between the student version and the professional version?
    What is the difference between v9 and v11?
Version Free Trial
  Example utterances for this intent:
    Is there a free trial?
    Where can I find a trial for no cost?
    I am student, is there a free trial available for me.
Troubleshooting Tech Support
  Example utterances for this intent:
    My download is not working, is there some technical documentation or support?
    I am having support problems.
    Do you know why the tool won't work on my Windows Machine?
Buyer state: Buy/Score: 5
  Example of Intents in the Buy stage:
Buy
  Example utterances for this intent:
    How can I buy the product?
    Where can I buy the product?
Purchase Options
  Example utterances for this intent:
    How can I purchase the product?
    Where can I purchase the product?
    What are my options for buying the product?
Pricing
  Example utterances for this intent:
    What is the price of the standard edition?
    What is the price of the product?
    I am a student, is there a special price for me?
Renewal
  Example utterances for this intent:
    How can I renew my subscription?
    Where can I go to renew my subscription?
    Can you tell me options for renewal?

According to the above described "buyer stage journey" embodiment of the present invention, each type of intent 314 that classifier 312 is configured to identify is assigned to be associated with one of the buyer stages during training for the re-ranker 322. The predefined score assigned to a respective buyer stage applies to any of the intents 314 of that buyer stage, where that score is used by re-ranker 312 when scoring a predicted next intent 318 for a live conversation 332.

In another embodiment of re-ranker 322, which may be referred to herein as a "simple score" embodiment, the ranking algorithm gives each intent of vector 318 a score from 1 to 100 that is predefined manually for each possible one of the respective intents 314 that classifier 312 is predefined to recognize. The intents in this embodiment are scored independently of journey stages.

In another embodiment of re-ranker 322, which may be referred to herein as a "intent sequence/probability" embodiment, for intents 314 that classifier 312 can recognize, the ranking algorithm gives each intent of vector 318 a score indicating historic tendencies of given sequences of intent 314. For example, given an initial input intent 314 sequence of [General_Information, Get_Started, Basic_Features] and a predicted next intent vector 318 of Trial 30%, Pricing 20%, Features_Analytics 10% and Demo 5% (where the % figures indicate likelihoods for each of the indicated next predicted intents 318, Trial, Pricing, Features_Analytics and Demo), ranking algorithm scores each of the following possible sequences, in order to determine relative values of next questions 328 whose underlying intents 314 are, respectively: Trial, Pricing, Features_Analytics or Demo:
  i. [General_Information, Get_Started, Basic_Features, Trial]
  ii. [General_Information, Get_Started, Basic_Features, Pricing]
  iii. [General_Information, Get_Started, Basic_Features, Features_Analytics]
  iv. [General_Information, Get_Started, Basic_Features, Demo]

For configuring this re-ranker 322 ranking algorithm, a score is first assigned manually to each intent 314 that classifier 312 is configured to recognize. The ranking algorithm is then configured to extract intent 314 sequences generated by intent classifier 312 from historic chat conversation transcripts 340, whereupon the intent sequence/probability algorithm of trainer/updater 323 trains on those extracted sequences, which includes calculating scores for each of the above listed intent 314 sequences i) through iv).

More specifically, trainer/updater 323 computes an initial score for the above intent 314 sequence i), by adding up the scores assigned to each of the intents 314 in the sequence, General_Information, Get_Started, Basic_Features and Trial. Trainer/updater 323 also extracts from the historic conversation transcripts 340, each subset of conversations that generated intent 314 sequences corresponding to intent 314 sequence i) (hereinafter referred to as the "sequence i) subset"). Trainer/updater 323 then determines the maximum valued intent that occurred after sequence i) in each transcript of the sequence i) subset. Trainer/updater 323 computes a sum of the initial score plus the scores for these max valued intents for the sequence i) subset, normalizes the sum by dividing the sum by [the number of conversation transcripts 340 for sequence i)] or, alternatively, a sum that includes the number of conversation transcripts 340 for sequence i), such as [1+the number of conversation transcripts 340 for sequence i)], for example. Trainer/updater 323 may then save for future reference the normalized sum as a final score Si) for the subsequence i) subset of historic conversation transcripts 340.

Alternatively, before saving the normalized score as the final score Si) for sequence i), trainer/updater 323 may adjust the normalized score based on the probability associated with the predicted next intent 318 included in sequence i), i.e., in this example, 30% for the predicted next intent "Trial." For example, may increase or decrease the normalized score Si) depending on magnitude of the probability associated with the predicted next intent 318 included in sequence i) relative to magnitudes of the probabilities associated with the other predicted next intents including in intent vector 318, where scores for higher magnitude probabilities are increased and vice versa. In another alternative, rather than adjusting normalized scores based on associated probabilities, re-ranker 322 may use the probabilities in the process of selecting the scored, next predicted intents 318 for outputting to intent to question mapper 326.

For each sequence ii), iii) and iv), trainer/updater 323 repeats the above extraction of subsets of transcripts 340, summation of scores, normalizing and saving. Then trainer/updater 323 orders the sequences i) through iv) by ranking of their respective sums Si), Sii), Siii) and Siv).

It should be appreciated from the forgoing that the final scores computed in this fashion from historic transcripts 340 provide values that indicates a historic degree or tendency for each respective sequence i) through iv) to lead to higher scored intents later in a conversation. In live conversation mode, intent re-ranker 322 applies the scores S to vector 318 to rank predicted next intents 318 in the live conversation in their contexts of corresponding intent sequences that preceded the respective prediction for next intents 318, according to which re-ranker 322 will select the highest ranked set of predicted next intents 318, such as the top three, to output as the most valued next intents 324.

In embodiments, the transformation function of re-ranker 322 may be applied as a "simple" filter to ones of the above mentioned re-ranker 322 embodiments, wherein the transformation function filters the intent vector filtered down to the three intents with the highest score without considering the probabilities associated with intents in vector 318. In other embodiments, the transformation function of re-ranker 322 may be applied as a "weighted probability" filter to transform the score for each intent in vector 318, wherein the transformation function multiplies the score for an intent by the intent's associated probability. In either the simple filter or the weighted probability filter embodiment, re-ranker 322 outputs 324 the subset of the received intents 318 that have the highest transformed scores, such as the top three, for example.

Figure 5:
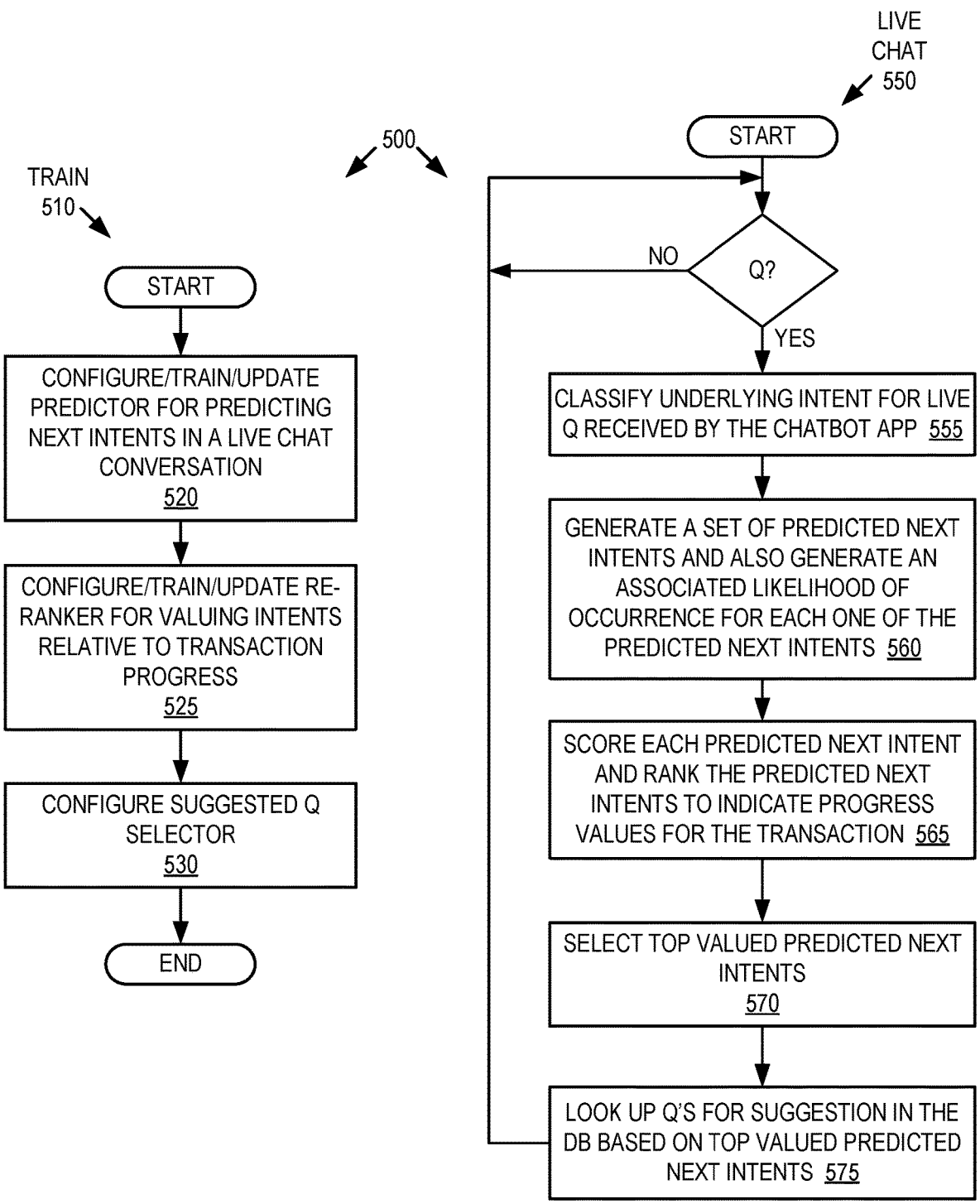
FIG. 5 is a flowchart for intent-based question suggestion to advance a transaction conducted via the chatbot application FIG. 3, according to an embodiment of the present invention.

Referring now to FIG. 5, processes 500 are illustrated in a flowchart for intent-based question suggestion to advance a transaction conducted via chatbot application 300 of FIG. 3, according to an embodiment of the present invention. With application 300 in a mode of operation 510 for training, configuring or updating, at 515 an intent classifier is trained, configured or updated, which includes defining a set of possible intents for intent classification that may underlie questions relating to transactions discussed in chat conversations to which application 300 is deployed. Using transcripts of historic chat conversations for previous chat conversations that concerned the same type of transaction, the classifier is trained or configured by manually tagging intents for questions in the transcripts and feeding the intent-tagged questions to a natural language processing trainer for the classifier.

Also, in mode of operation 510 for training, configuring or updating, at 520 a predictor of application 300 is configured, trained or updated for predicting next intents in a live chat conversation. This may include using the intent classifier trained at 515 to classify underlying intent for each question in such historic chat conversation transcripts and configuring the predictor to predict next intents and associated likelihood of occurrence for each one of the predicted next intents based on intent sequence pairs, that is, (intent, next intent) pairs, generated from the chat conversation transcripts. In development of one or more embodiments of the present invention, it was an unexpected result that a next intent may be predicted merely from a history of intent-next intent sequence pairs reliably enough to provide useful results in the chatbot application 300 as disclosed herein, e.g., results that enable suggesting next questions to the user in a fashion as described herein that actually improve progress for transactions that are the subject of a chatbot conversation 332, which includes preventing regression in transaction stages.

Also, in mode of operation 510 for training, configuring or updating, at 525 a re-ranker of application 300 is configured, trained or updated for valuing intents relative to progress for the type of transaction for which the chatbot application 300 is deployed. This may include defining stages of the transaction and assigning scores to the stages to indicate value of each stage in progressing to successful conclusion of the transaction and assigning each intent of the possible intent set to one of the respective stages of the transaction, wherein the scores assigned to each stage will apply to the intents assigned to the stage.

Also in mode of operation 510 for training, configuring or updating, at 530 suggested a question selector engine is configured, trained or updated by manually identifying or preparing questions to suggest to the chatbot user that the user may wish to ask, such as by referring to historic chat conversations for a transaction like the type of transaction for which the chat by application is deployed, and by identifying the intent (from the possible set of intents) that underlies each question, which may be done manually or using the trained intent classifier. Then the questions for suggestion and the associated intents are stored in a database configured in such a way that the suggested questions can be looked up based on intent.

With chatbot application 300 in a live chat conversation mode of operation 550, the trained intent classifier, at 555, classifies and outputs at least one underlying intent for a live question received by the chatbot application 300. The trained next intent predictor, at 560, generates and outputs a set of predicted next intents for the received question and also generates and outputs an associated likelihood of occurrence for each one of the predicted next intents in the set. The trained re-ranker, at 565, scores each predicted next intent and ranks them to indicate progress values for the transaction involved in the chat session. The re-ranker, at 570, selects and outputs a set of top ranked, predicted next intents. The question selection engine, at 575, looks up questions for suggestion in the database based on the set of top ranked, predicted next intents and outputs them to the user via a user interface. Application 300, then goes back to 555 to receive a next question, remark or request from the user, which may be one of the questions suggested to the user by application 300 at 575.

Figure 6:
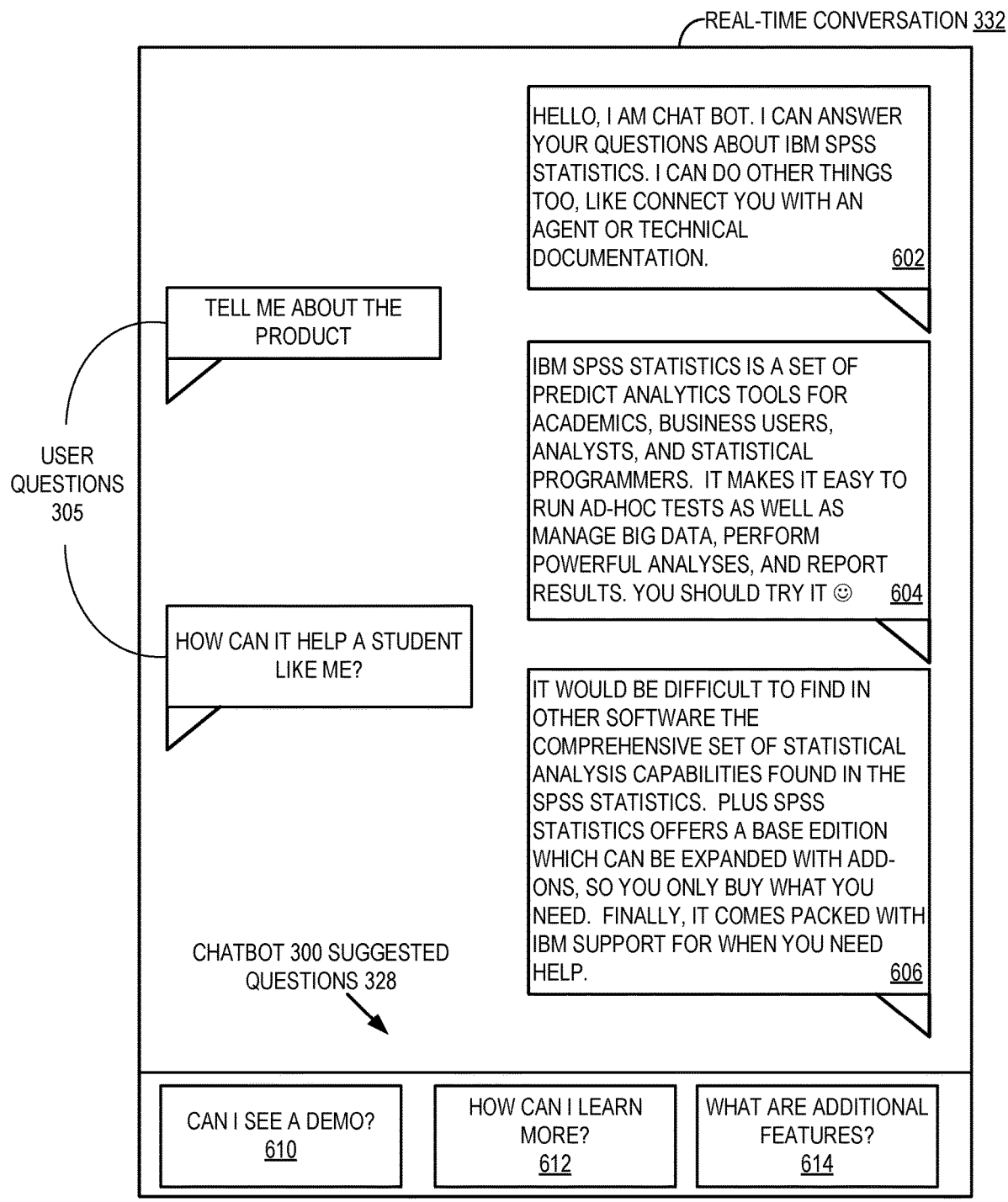
FIG. 6 illustrates an example real-time conversation, according to an embodiment of the present invention.

Referring now to FIG. 6, an example real-time conversation 332 is illustrated, according to an embodiment of the present invention. While the disclosure herein has focused on chatbot application 300 presenting suggested questions 328 that user 335 may wish to ask, such as questions 610, 612 and 614 shown in FIG. 6, it should be appreciated that application 300 may also provide conventional chatbot responses, according to well-known methods and structures, such as responses 602, 604 and 606 shown in FIG. 6.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Likewise, the actions recited in the claims can be performed in a different order and still achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, no element described herein is required for the practice of the invention unless expressly described as essential or critical.

The corresponding structures, materials, acts, and equivalents of all means or step plus function elements in the claims below are intended to include any structure, material, or act for performing the function in combination with other claimed elements as specifically claimed.

It should be appreciated that the particular implementations shown and described herein are illustrative of the invention and its best mode and are not intended to otherwise limit the scope of the present invention in any way. Other variations are within the scope of the following claims. Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description but is not intended to be exhaustive or limited to the invention in the form disclosed.

What is claimed is:

1. A computer-system implemented method for a chatbot application, the method comprising:

receiving, by a trained next intent predictor in a trained state from an intent classifier in a trained state when the chatbot application is in a mode of live chat conversation with a user for a predetermined type of transaction, an intent that the trained intent classifier has determined underlies a first live question received by the trained intent classifier from the user, wherein a predetermined progression of stages and predetermined values for the stages are defined for the transaction type;

generating, by the trained next intent predictor in response to receiving the intent, predicted next intents and respective probabilities for the predicted next intents, wherein each one of the predicted next intents has a predetermined association with one of the stages;

receiving the predicted next intents and probabilities by a re-ranker in a trained state;

generating scores for the predicted next intents by the trained re-ranker, wherein the trained re-ranker generates the scores in response to the probabilities and the values of the associated stages for the predicted next intents;

selecting at least one of the predicted next intents by the trained re-ranker in response to the scores of the predicted next intents; and sending, by a question selection engine in response to receiving the at least one predicted next intent, at least one suggested question to the user, so that the chatbot application provides to the user, in response to the first question from the user, at least one suggested next question the user may wish to ask.

2. The method of claim 1, comprising:
   training, in a training mode of the chatbot application, the re-ranker to score intents relative to progress for the predetermined type of transaction.

3. The method of claim 1, wherein the score for each respective next predicted intent indicates respective progress within the predetermined transaction.

4. The method of claim 3, wherein the trained intent classifier is configured to generate, in response to receiving user questions, intents from among a predefined set of possible intent, and wherein training the re-ranker comprises:
   defining the stages of the predetermined transaction and assigning the predefined values to the respective stages to indicate transaction progress associated with each respective stage;
   and assigning each intent of the set of possible intent to one of the respective stages of the transaction, wherein the predetermined value assigned to each stage apply to the intents of the stage.

5. The method of claim 1, comprising:
   training, in a training mode of the next intent predictor, a model for predicting a user's next intent that will follow a current question from the user in a live chat conversation, wherein the training for the model is based solely on sequences of intents determined from historic chat conversation transcripts.

6. The method of claim 5, wherein training the next intent predictor comprises:
   providing, to a next intent prediction trainer, sequences of intents that the intent classifier has determined underlie sequences of questions from the historic chat conversation transcripts, wherein the next intent prediction trainer trains the model for the next intent predictor based solely on intent-next intent pairs from the sequences of questions.

7. The method of claim 1, comprising:
   receiving from the trained intent classifier, by the chatbot application when the chatbot application is in the mode of live chat conversation with the user, at least one intent that the intent classifier has determined underlies a second live question received by the trained intent classifier from the user, wherein the second live question is one of the questions suggested to the user by the chatbot application in response to the first live question.

8. A system for operating a chatbot application comprising:
   a processor; and
   a computer readable storage medium connected to the processor, wherein the computer readable storage medium has stored thereon a program for controlling the processor, and wherein the processor is operative with the program to execute the program for:
   receiving, by a trained next intent predictor in a trained state from an intent classifier in a trained state, when the chatbot application is in a mode of live chat conversation with a user for a predetermined type of transaction, an intent that the trained intent classifier has determined underlies a first live question received by the trained intent classifier from the user, wherein a predetermined progression of stages and predetermined values for the stages are defined for the transaction type;
   generating, by the trained next intent predictor in response to receiving the intent, predicted next intents and respective probabilities for the predicted next intents, wherein each one of the predicted next intents has a predetermined association with one of the stages;
   receiving the predicted next intents and probabilities by a re-ranker in a trained state;
   generating scores for the predicted next intents by the trained re-ranker, wherein the trained re-ranker generates the scores in response to the probabilities and the values of the associated stages for the predicted next intents;
   selecting at least one of the predicted next intents by the trained re-ranker in response to the scores of the predicted next intents; and
   sending, by a question selection engine in response to receiving the at least one predicted next intent, at least one suggested question to the user, so that the chatbot application provides to the user, in response to the first question from the user, at least one suggested next question the user may wish to ask.

9. The system of claim 8, comprising:
   training, in a training mode of the chatbot application, the re-ranker to score intents relative to progress for the predetermined type of transaction.

10. The system of claim 8, wherein the score for each respective next predicted intent indicates respective progress within the predetermined transaction.

11. The system of claim 10, wherein the trained intent classifier is configured to generate, in response to receiving user questions, intent from among a predefined set of possible intent, and wherein training the re-ranker comprises:
    defining the stages of the predetermined transaction and assigning the predefined values to the respective stages to indicate transaction progress associated with each respective stage;
    and assigning each intent of the set of possible intent to one of the respective stages of the transaction, wherein the predetermined value assigned to each stage apply to the intents of the stage.

12. The system of claim 8, comprising:
    training, in a training mode of the next intent predictor, a model for predicting a user's next intent that will follow a current question from the user in a live chat conversation, wherein the training for the model is based solely on sequences of intents determined from historic chat conversation transcripts.

13. The system of claim 12, wherein training the next intent predictor comprises:
    providing, to a next intent prediction trainer, sequences of intents that the intent classifier has determined underlie sequences of questions from the historic chat conversation transcripts, wherein the next intent prediction trainer trains the model for the next intent predictor based solely on intent-next intent pairs from the sequences of questions.

14. The system of claim 8, comprising:
    receiving from the trained intent classifier, by the chatbot application when the chatbot application is in the mode of live chat conversation with the user, at least one intent that the intent classifier has determined underlies a second live question received by the trained intent classifier from the user, wherein the second live question is one of the questions suggested to the user by the chatbot application in response to the first live question.

15. A computer program product for operating a chatbot application, including a computer readable storage medium having instructions stored thereon for execution by a computer system, wherein the instructions, when executed by the computer system, cause the computer system to implement a method comprising:

receiving, by a trained next intent predictor in a trained state from an intent classifier in a trained state, when the chatbot application is in a mode of live chat conversation with a user for a predetermined type of transaction, an intent that the trained intent classifier has determined underlies a first live question received by the trained intent classifier from the user, wherein a predetermined progression of stages and predetermined values for the stages are defined for the transaction type;

generating, by the trained next intent predictor in response to receiving the intent, predicted next intents and respective probabilities for the predicted next intents, wherein each one of the predicted next intents has a predetermined association with one of the stages;

receiving the predicted next intents and probabilities by a re-ranker in a trained state:

generating scores for the predicted next intents by the trained re-ranker, wherein the trained re-ranker generates the scores in response to the probabilities and the values of the associated stages for the predicted next intents;

selecting at least one of the predicted next intents by the trained re-ranker in response to the scores of the predicted next intents; and sending, by a question selection engine in response to receiving the at least one predicted next intent, at least one suggested question to the user, so that the chatbot application provides to the user, in response to the first question from the user, at least one suggested next question the user may wish to ask.

16. The computer program product of claim 15, wherein the instructions, when executed by the computer system, cause the computer system to implement a method comprising:

training, in a training mode of the chatbot application, the re-ranker to score intents relative to progress for the predetermined type of transaction.

17. The computer program product of claim 15, wherein the score for each respective next predicted intent of the set indicates respective progress within the predetermined transaction.

18. The computer program product of claim 17, wherein the trained intent classifier is configured to generate, in response to receiving user questions, intents from among a predefined set of possible intent, and wherein training the re-ranker comprises:

defining the stages of the predetermined transaction and assigning the predefined values to the respective stages to indicate transaction progress associated with each respective stage;

and assigning each intent of the set of possible intent to one of the respective stages of the transaction, wherein the predetermined value assigned to each stage apply to the intents of the stage.

19. The computer program product of claim 15, wherein the instructions, when executed by the computer system, cause the computer system to implement a method comprising:

training, in a training mode of the next intent predictor, a model for predicting a user's next intent that will follow a current question from the user in a live chat conversation, wherein the training for the model is based solely on sequences of intents determined from historic chat conversation transcripts.

20. The computer program product of claim 19, wherein training the next intent predictor comprises:

providing, to a next intent prediction trainer, sequences of intents that the intent classifier has determined underlie sequences of questions from the historic chat conversation transcripts, wherein the next intent prediction trainer trains the model for the next intent predictor based solely on intent-next intent pairs from the sequences of questions.

* * * * *